(12) United States Patent
Lutz et al.

(10) Patent No.: US 9,104,479 B2
(45) Date of Patent: Aug. 11, 2015

(54) APPARATUS AND METHOD FOR ROUNDING A FLOATING-POINT VALUE TO AN INTEGRAL FLOATING-POINT VALUE

(75) Inventors: David Raymond Lutz, Austin, TX (US); Neil Burgess, Austin, TX (US); Sabrina Marie Romero, Pflugerville, TX (US)

(73) Assignee: ARM Limited, Cambridge (GB)

( * ) Notice: Subject to any disclaimer, the term of this patent is extended or adjusted under 35 U.S.C. 154(b) by 913 days.

(21) Appl. No.: 13/313,062

(22) Filed: Dec. 7, 2011

(65) Prior Publication Data

US 2013/0151576 A1 Jun. 13, 2013

(51) Int. Cl.
G06F 7/499 (2006.01)
(52) U.S. Cl.
CPC ........ G06F 7/49947 (2013.01); G06F 7/49957 (2013.01)
(58) Field of Classification Search
USPC .................................................. 708/497, 551
See application file for complete search history.

(56) References Cited

U.S. PATENT DOCUMENTS

| 4,779,220 | A | 10/1988 | Nukiyama |
| 4,839,846 | A | 6/1989 | Hirose et al. |
| 5,257,215 | A | 10/1993 | Poon |
| 5,329,475 | A * | 7/1994 | Juri et al. ...................... 708/551 |
| 5,508,948 | A | 4/1996 | Hatta |
| 5,696,709 | A | 12/1997 | Smith, Sr. |
| 5,742,537 | A | 4/1998 | Wolrich et al. |
| 6,148,316 | A | 11/2000 | Herbert et al. |
| 6,243,728 | B1 * | 6/2001 | Farooqui et al. ............. 708/209 |
| 6,301,594 | B1 | 10/2001 | Ahmed |
| 6,490,606 | B1 | 12/2002 | Green et al. |
| 6,510,446 | B1 * | 1/2003 | Fukagawa ...................... 708/497 |
| 6,889,242 | B1 * | 5/2005 | Sijstermans et al. .......... 708/551 |
| 6,965,906 | B1 | 11/2005 | Dhablania |
| 7,225,323 | B2 * | 5/2007 | Siu et al. ........................ 712/222 |
| 2002/0087609 | A1 | 7/2002 | Zohar |
| 2004/0254970 | A1 | 12/2004 | Driker et al. |
| 2004/0254973 | A1 * | 12/2004 | Tang et al. ..................... 708/670 |
| 2006/0136540 | A1 | 6/2006 | Tang et al. |
| 2006/0179097 | A1 | 8/2006 | Fleischer et al. |
| 2006/0181436 | A1 | 8/2006 | Moriya et al. |
| 2007/0073798 | A1 | 3/2007 | Donofrio et al. |
| 2007/0282938 | A1 | 12/2007 | Abdallah et al. |
| 2010/0262722 | A1 * | 10/2010 | Vauthier et al. ................... 710/8 |
| 2011/0029760 | A1 | 2/2011 | Elmer et al. |
| 2011/0055307 | A1 * | 3/2011 | Hurd et al. ..................... 708/497 |

OTHER PUBLICATIONS

International Preliminary Report on Patentability issued Jun. 19, 2014 in PCT/GB2012/052938, 6 pages.
International Search Report and Written Opinion of the International Searching Authority mailed May 7, 2013 in PCT/GB2012/052938.

* cited by examiner

*Primary Examiner* — Chuong D Ngo
*Assistant Examiner* — Matthew Sandifer
(74) *Attorney, Agent, or Firm* — Nixon & Vanderhye P.C.

(57) ABSTRACT

Processing circuitry is provided to perform an operation FRINT for rounding a floating-point value to an integral floating-point value. Control circuitry controls the processing circuitry to perform the FRINT operation in response to an FRINT instruction. The processing circuitry includes shifting circuitry for generating a rounding value by shifting a base value, adding circuitry for adding the rounding value to the significand of the floating-point value to generate a sum value, mask generating circuitry for generating a mask for clearing fractional-valued bits of the sum value, and masking circuitry for applying the mask to the sum value to generate the integral floating-point value.

17 Claims, 9 Drawing Sheets

APPARATUS AND METHOD FOR ROUNDING A FLOATING-POINT VALUE TO AN INTEGRAL FLOATING-POINT VALUE

BACKGROUND OF THE INVENTION

1. Field of the Invention

The present invention relates to the field of data processing. In particular, the invention relates to an apparatus and method for rounding a floating-point value to an integral floating-point value.

2. Description of the Prior Art

Processors for performing arithmetic operations on floating-point numbers are known. In floating-point representation, numbers are represented using a significand 1.F, an exponent E and a sign bit S. The sign bit S represents whether the floating-point number is positive or negative, the significand 1.F represents the significant digits of the floating-point number, and the exponent E represents the position of the radix point (also known as a binary point) relative to the significand. By varying the value of the exponent, the radix point can "float" left and right within the significand. This means that for a predetermined number of bits, a floating-point representation can represent a wider range of numbers than a fixed point representation (in which the radix point has a fixed location within the significand). However, the extra range is achieved at the expense of reduced precision since some of the bits are used to store the exponent. Sometimes, a floating-point arithmetic operation generates a result with more significant bits than the number of bits used for the significand. If this happens then the result is rounded to a value that can be represented using the available number of significant bits.

FIG. 1 of the accompanying drawings shows how floating-point numbers are stored within a register or memory. In a single precision representation, 32 bits are used to store the floating-point number. One bit is used as the sign bit S, eight bits are used to store the exponent E, and 23 bits are used to store the fractional portion F of the significand 1.F. The 23 bits of the fractional portion F, together with an implied bit having a value of one, make up a 24-bit significand 1.F. The radix point is initially assumed to be placed between the implied bit and the 23 stored bits of the significand. The stored exponent E is biased by a fixed value 127 such that in the represented floating-point number the radix point is shifted left from its initial position by E−127 places if E−127 is negative (e.g. if E−127=−2 then a significand of 1.01 represents 0.0101), or right from its initial position by E−127 places if E−127 is positive (e.g. if E−127=2 then a significand of 1.01 represents 101). The bias is used to make it simpler to compare exponents of two floating-point values as then both negative and positive shifts of the radix point can be represented by a positive value of the stored exponent E. As shown in FIG. 1, the stored representation S[31], E[30:23], F[22:0] represents a number with the value $(-1)^S * 1.F[\mathbf{22:0}] * 2^{(E-127)}$. A single-precision floating-point number in this form is considered to be "normal". If a calculated floating-point value is not normal (for example, it has been generated with the radix point at a position other than between the left-most two bits of the significand), then it is normalized by shifting the significand left or right and adjusting the exponent accordingly until the number is of the form $(-1)^S * 1.F[\mathbf{22:0}] * 2^{E-127}$.

A double precision format is also provided in which the significand and exponent are represented using 64 stored bits. The 64 stored bits include one sign bit, an 11-bit exponent and the 52-bit fractional portion F of a 53-bit significand 1.F. In double precision format the exponent E is biased by a value of 1023. Thus, in the double precision format a stored representation S[63], E[62:52], F[51:0] represents a floating-point value $(-1)^S * 1.F[\mathbf{51:0}] * 2^{E-1023}$.

In the present application, some examples will be explained with reference to the single precision floating-point format. However, it will be appreciated that the invention could also be applied to the double precision format (or any other floating-point format) and that the bit values shown in subsequent Figures could be replaced by values appropriate to the floating-point format being used.

One kind of floating-point operation is a round to integral floating-point operation (FRINT), an operation which rounds a floating-point value to an integral floating-point value. For example, a floating-point value of 6.75 can be rounded to one of the neighbouring integral values 6.0 or 7.0. The present technique seeks to reduce the latency associated with performing the FRINT operation.

SUMMARY OF THE INVENTION

Viewed from one aspect, the invention provides a data processing apparatus comprising:

processing circuitry configured to perform a round to integral floating-point operation for rounding a floating-point value to an integral floating-point value, said floating-point value having a significand and an exponent; and control circuitry configured to control said processing circuitry to perform said round to integral floating-point operation in response to execution of a floating-point round to integral floating-point instruction;

said processing circuitry comprising:

shifting circuitry configured to generate a rounding value by shifting a base value by a shift amount dependent on said exponent of said floating-point value;

adding circuitry configured to add said rounding value to said significand of said floating-point value to generate a sum value;

mask generating circuitry configured to generate a mask for clearing bits of said sum value having bit positions corresponding to fractional-valued bit positions of said significand; and masking circuitry configured to apply said mask to said sum value to generate said integral floating-point value.

The round to integral floating-point operation (FRINT) has typically been implemented in software. However, the present technique recognises that this approach is slow since each instruction needs to be separately fetched, decoded and executed.

By providing processing circuitry for performing the FRINT operation in hardware and control circuitry for controlling the processing circuitry to perform the FRINT operation in response to execution of a single floating-point round to integral floating-point instruction (FRINT instruction), the FRINT operation can be performed more quickly than in previous software implementations.

The present technique also recognises that in typical floating-point hardware circuits, rounding is limited to take place at a predetermined fixed location within the significand, usually the least significant bit of the significand. However, if rounding can only take place at the least significant bit of the significand, then the significand would need to be right shifted to convert the floating-point value to an integral floating-point value before performing the rounding on the least significant bit of the shifted value. The rounded value would then need to be normalised by left shifting the rounded value to convert the value back into the normal floating-point format. Such a left shift would not typically be required for other floating-point operations, and so adding hardware for performing such a left shift to processing circuitry would add a processing cycle to the processing circuitry, complicating the circuitry and slowing the processing of most other floating-point operations.

To avoid this problem, the present technique provides shifting circuitry which generates a rounding value by shifting a base value by a shift amount dependent on the exponent of the floating-point value to be rounded, and adding circuitry for adding the generated rounding value to the significand of the floating-point value. Any fractional-valued bit values remaining in the sum value can be cleared by applying a mask to the sum value. Since the shift is applied to generate the rounding value, no shift is necessary for the significand, and so the sum value resulting from the addition of the significand and shifted rounding value is a normalised floating-point value. It is not necessary to perform a subsequent left shift, and so an efficient hardware mechanism for performing the round to integral floating-point operation can be implemented.

It will be appreciated that it is not necessary to use the shifting circuitry, adding circuitry, mask generating circuitry and masking circuitry for all instances of execution of the FRINT instruction. There may be cases where the value of the floating-point value to be rounded is such that the rounded result can be determined easily without the need to actually perform the shifting, adding and masking. For example, if a floating-point value to be rounded is already an integer then rounding will not affect its value and so the input value can be written directly to an output register. Also, if the magnitude of the floating-point value is less than 1, the rounded result will be 0 or 1 and this can be determined without the need for full execution of the round to integral floating-point operation. Hence, the control circuitry may determine on an instruction-by-instruction basis whether it is necessary to use the full rounding capability of the processing circuitry.

Although it would be possible to construct the rounding value by using an equivalent left shift, it may be most convenient for the shifting circuitry to right shift the base value to generate the rounding value.

The numerical values of the bits of the significand are a function of the exponent. In general, some of the bits represent values greater than or equal to 1.0 (the integral-valued bits) and some of the bits represent values less than 1.0 (the fractional-valued bits).

The rounding value may have a leading non-zero bit at a bit position corresponding to a bit position of the most significant fractional-valued bit of the significand of the floating-point value. The most significant fractional-valued bit of the significand is the bit representing a value of a half. Adding a half to the significand and clearing any fractional-valued bits in the sum is a technique for rounding the floating-point value to the nearest integer. Other rounding techniques can be implemented by adding a value of more than a half but less than one. In both cases, the leading non-zero bit of the rounding value is at the most significant fractional-valued bit position.

The base value may have a most significant bit having a non-zero value. The shifting circuitry may be configured to right shift the base value by shift amount of (E−BIAS+1) bit positions, where E represents the exponent of the floating-point value and BIAS represents the exponent bias of the floating-point value. This shift enables the leading non-zero bit to be shifted to the most significant fractional-valued bit position corresponding to a value of a half.

The masking circuitry may comprise an AND gate configured to apply a bitwise AND operation to the sum value and the mask. The bits of the mask at bit positions corresponding to fractional-valued bit positions of the significand may have bit values of zero while the bits of the mask at bit positions corresponding to integral-valued bit positions of the significand may have bit values of one. In this way, the mask can be used to clear the fractional-valued bits of the sum value, to generate the integral floating-point value.

Although the mask may be generated in a number of ways, for example by shifting a mask base value, it may be convenient for the mask to be generated based on the rounding value. This can avoid the need to perform a further shift. As discussed above, the leading non-zero bit of the rounding value is at the most significant fractional-valued bit position, and this corresponds to the leading zero bit in the mask. Therefore, the rounding value can easily be transformed into the mask. For example, the mask may be generated with non-zero bit values at bit positions that are more significant than the leading non-zero bit of the rounding value and zero bit values at the remaining bit positions of the mask.

The processing circuitry may be able to carry out other floating-point operations as well as the FRINT operation. In one example, the control circuitry may control the processing circuitry to perform a floating-point add operation in response to execution of a floating-point add instruction. The shifting circuitry and adding circuitry may be used for both the add operation and the FRINT operation. By sharing circuitry for performing the FRINT operation and the add operation, circuit area can be reduced.

A floating-point value lies between two neighbouring integer values. Different rules may be implemented for determining which of the two integer values should be the rounding result. Therefore, the processing circuitry may be provided at least one rounding mode for selecting which integer value to round the floating-point value to during the FRINT operation. If the processing circuitry has a plurality of rounding modes, then the PRINT instruction may specify which of the rounding modes should be used for the FRINT operation. For example, a different instruction opcode may be used for controlling each different FRINT operation, or an instruction having a single opcode may have a rounding mode specifying field which specifies which rounding mode is to be used.

For example, the processing circuitry may have a round away from zero (RU) rounding mode for rounding the floating-point value to the one of the two neighbouring integers having the greatest absolute magnitude. For example, a value of 2.25 would be rounded to the integer 3.0 in the RU rounding mode, while a value of −2.25 would be rounded to the integer −3.0.

In the RU rounding mode, all bits of the base value may have non-zero bit values (a base value of 0b1111111 . . . or a binary string of ones). When the base value is shifted to generate the rounding value, the rounding value will have non-zero bit values at each fractional-valued bit location, corresponding to a decimal value of 0.999 . . . when using decimal arithmetic. This means that adding the rounding value to the significand and clearing the fractional-valued bits of the sum using the mask will result in the neighbouring integer that is greater than the floating-point value. For example, adding 0.999 . . . to the value 2.2 yields the sum of 3.1999 . . . , and clearing the fractional-valued bits yields the correctly rounded integral floating-point value of 3.0. If the round to integral floating-point operation is performed on a value that is already an integer, then adding 0.999 . . . does not change the integral-valued bits of the floating-point value and so masking the fractional-valued bits of the sum yields the original integral floating-point value.

Another rounding mode may be the round nearest, ties to even, (RNE) rounding mode for rounding the floating-point value to the nearest of the two neighbouring integral floating-point values, with floating-point values lying halfway between two integral floating-point values being rounded to the one of the two integral floating-point values that is an even value. For example, a value of 2.9 would be rounded to the nearest integral floating-point value of 3.0, while values of 3.5 and 4.5 would both be rounded to the nearest even integral floating-point value of 4.0. This mode can be useful for avoiding a rounding bias towards higher integer numbers which could occur if values lying half way between two integers were always rounded up.

The RNE rounding mode may be implemented in the present technique by providing the base value with a most significant bit having a non-zero bit value and remaining bits having zero-bit values (i.e. a base value of 0b1000 . . . ). Hence, when the base value is shifted to generate the rounding value, the rounding value has a value of a half. By adding a half to the significand and clearing any fractional-valued bits, the significand is rounded to the nearest integral floating-point value. For example, adding a half to a value of 2.3 produces a sum of 2.8, and clearing the fractional-valued bits yields a rounded value of 2.0. On the other hand adding a half to a value of 2.9 yields the sum of 3.4, and then clearing the fractional-valued bits gives a rounded integral floating-point value of 3.0, which is the closest integer to 2.9.

In the RNE rounding mode, if adding a half will result in an odd value, which will occur if the floating-point value lies half way between the two integers and a least significant integral-valued bit of the significand has a zero bit value, then the result value is corrected to produce an even value. The present technique provides a convenient way of ensuring an even result by correcting the mask so that applying the mask to the sum of the significand and the rounding value will clear a bit of the sum value having a bit position corresponding to the least significant integral-valued bit of the significand. For example, the mask can be left shifted by one bit position so that there is now a non-zero bit value corresponding to the least significant integral-valued bit position. This ensures that when the mask is applied to the sum value, the least significant bit will be cleared to generate an even value.

Another rounding mode may be the round towards zero (RZ) rounding mode for rounding the floating-point value to the one of the two neighbouring integral floating-point values having the smallest absolute magnitude. This rounding mode is equivalent to a truncation of the floating-point value to discard any fractional-valued bits while retaining the existing integral-valued bits.

Since the integer portion of the floating-point value remains the same when rounding using the RZ rounding mode, there is no need to add a rounding constant to the integral-valued portion of the significand. However, the present technique recognises that the FRINT operation can be implemented more efficiently if the same circuitry is used to perform the RZ rounding mode as for the other rounding modes. Therefore, the rounding value may still be calculated for the RZ rounding mode, and after generating the rounding value, all bits of the rounding value may be set to zero before adding the zeroed rounding value to the significand to generate the sum value. Even though the unzeroed rounding value is not required for the addition in the RZ rounding mode, it is still useful to calculate the rounding value to allow the mask to be generated.

Viewed from another aspect, the present invention provides a non-transitory computer-readable storage medium storing a computer program for controlling a computer to provide a virtual machine execution environment corresponding to a data processing apparatus described above. Hence, the computer need not actually have the processing circuitry described above, but may execute a virtual machine program for providing an execution environment for executing program instructions as if they were being executed on the actual circuitry.

Viewed from another aspect, the present invention may provide a data processing apparatus comprising:

processing means for performing a round to integral floating-point operation for rounding a floating-point value to an integral floating-point value, said floating-point value having a significand and an exponent; and control means for controlling said processing means to perform said round to integral floating-point operation in response to execution of a floating-point round to integral floating-point instruction;

said processing means comprising:

shifting means for generating a rounding value by shifting a base value by a shift amount dependent on said exponent of said floating-point value;

adding means for adding said rounding value to said significand of said floating-point value to generate a sum value;

mask generating means for generating a mask for clearing bits of said sum value having bit positions corresponding to fractional-valued bit positions of said significand; and masking means for applying said mask to said sum value to generate said integral floating-point value.

Viewed from a further aspect the present invention may provide a method of performing a round to integral floating-point operation for rounding a floating-point value to an integral floating-point value, said floating-point value comprising a significand and an exponent, said method comprising steps of:

generating a rounding value by shifting a base value by a shift amount dependent on said exponent of said floating-point value;

adding said rounding value to said significand of said floating-point value to generate a sum value;

generating a mask for clearing bits of said sum value having bit positions corresponding to fractional-valued bit positions of said significand; and applying said mask to said sum value to generate said integral floating-point value;

wherein said method is performed by processing circuitry in response to execution of a floating-point round to integral floating-point instruction.

Further particular and preferred aspects of the present invention are set out in the accompanying independent and dependent claims. Features of the dependent claims may be combined with features of the independent claims as appropriate, and in combinations other than those explicitly set out in the claims.

The above, and other objects, features and advantages of this invention will be apparent from the following detailed description of illustrative embodiments which is to be read in connection with the accompanying drawings.

DESCRIPTION OF THE EMBODIMENTS

Figure 1:
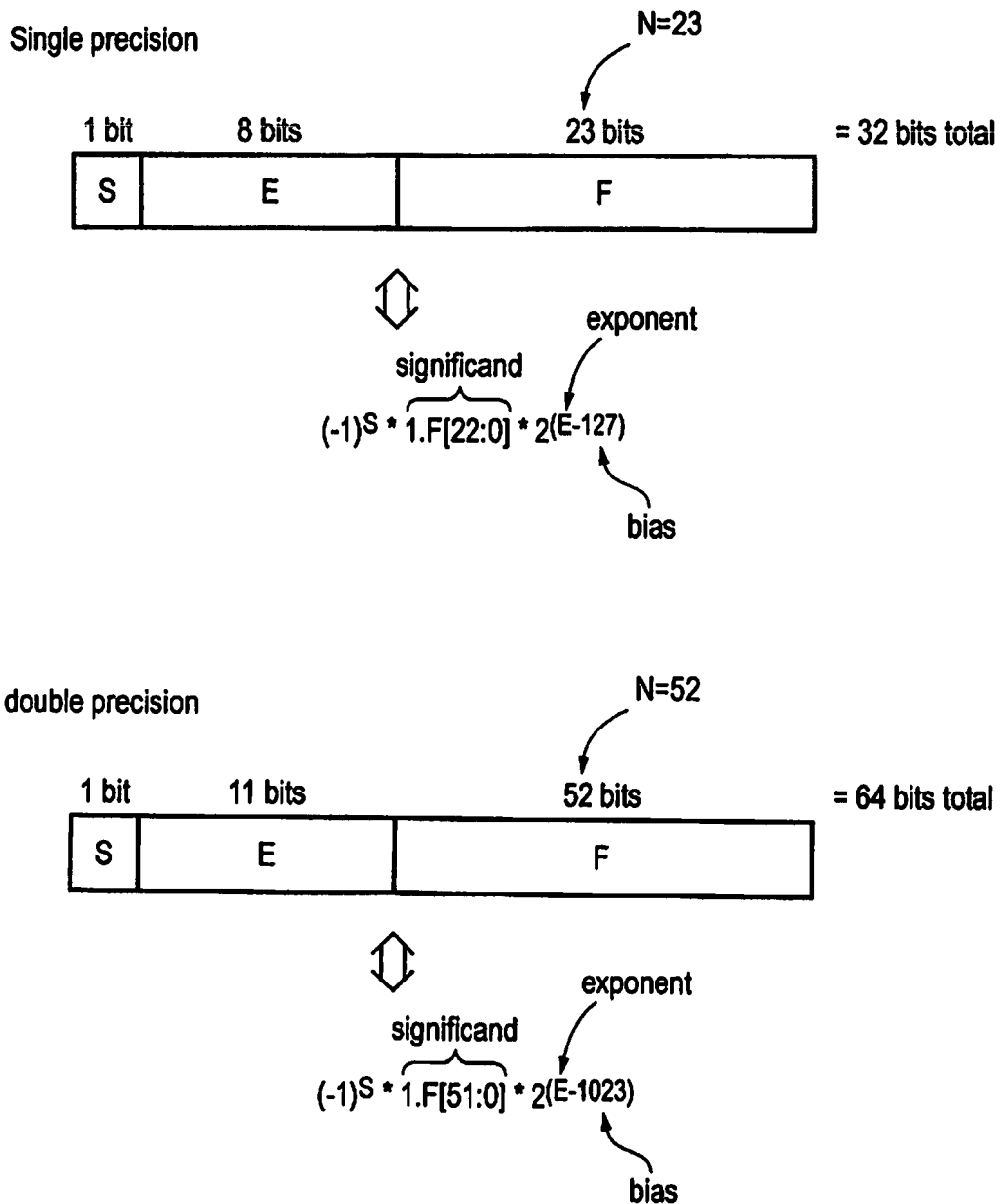
FIG. 1 illustrates floating-point number representation.
Figure 2:
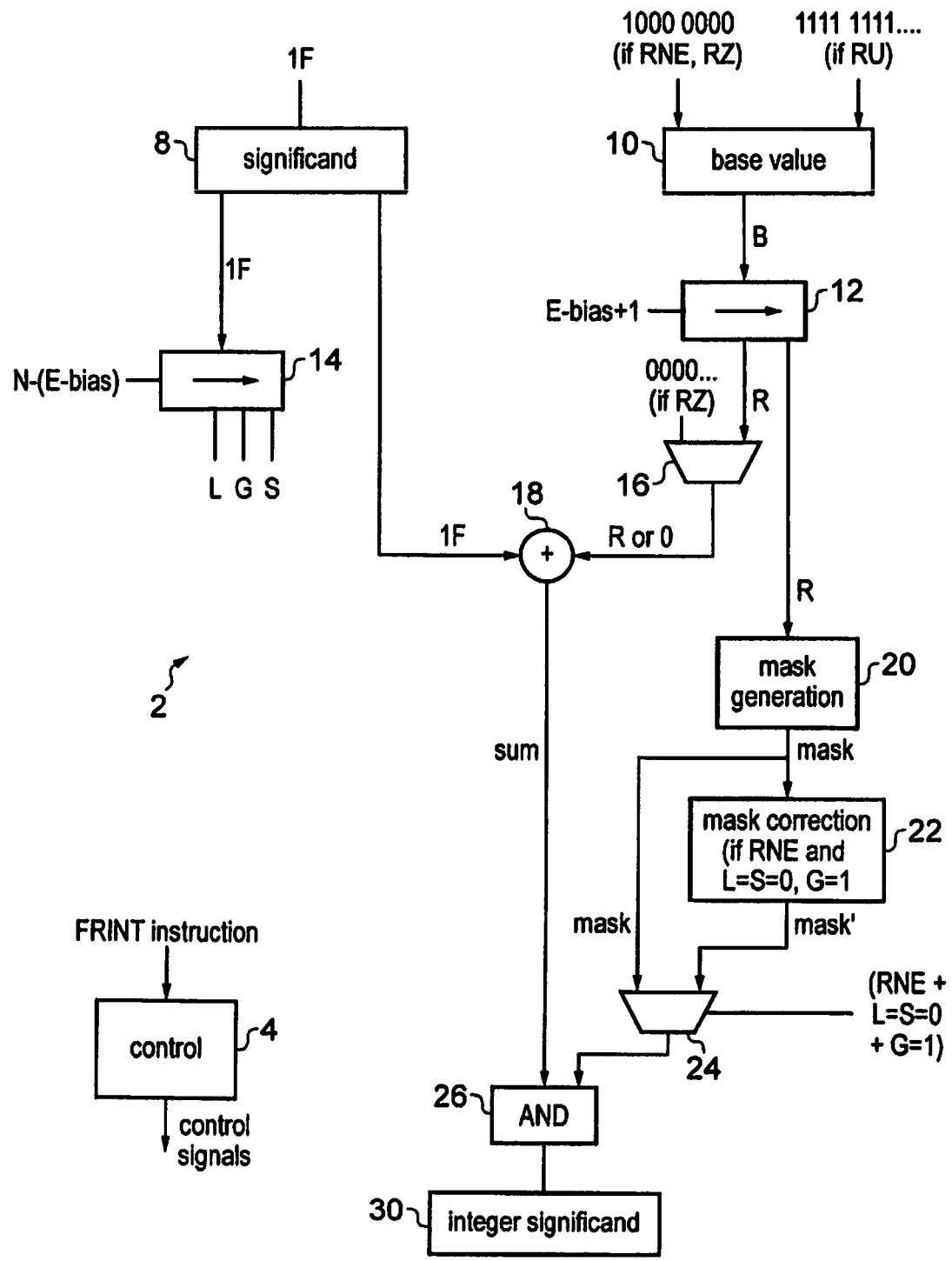
FIG. 2 illustrates processing circuitry for performing a FRINT operation.

FIG. 2 schematically illustrates a portion of a processing apparatus having processing circuitry 2 for performing a FRINT operation for rounding a floating-point value having a significand 1.F and exponent E to an integral floating-point value. Control circuitry 4 is provided for controlling the processing circuitry to perform the FRINT operation. The control circuitry 4 is responsive to execution of an FRINT instruction to generate control signals for controlling the various elements of the processing circuitry 2 to perform the PRINT operation. It will be appreciated that the processing circuitry 2 may comprise other elements other than those illustrated, and that the elements illustrated for performing the FRINT operation are schematic such that the same operation may be carried out using other hardware.

The processing circuitry 2 comprises a register 8 for storing the significand 1.F of the floating-point value to be rounded and a register 10 for storing a base value for constructing a rounding constant. The processing circuitry 2 also comprises a right shifter 12 for right shifting the base value B and a right shifter 14 for right shifting the significand 1.F to generate status flags L, G, S. A multiplexer 16 is arranged to select either the rounding value generated by the right shifter 12 or a zero value, and an adder 18 is provided to add the output of the multiplexer 16 to the unshifted significand 1.F to generate a sum value.

A mask generation circuit 20 is also provided for generating a mask based on the rounding value generated by the right shifter 12, and a mask correction circuit 22 is provided for correcting the mask to generate a corrected mask (mask'). Another multiplexer 24 selects either the mask generated by the mask generating circuit 20 or the corrected mask generated by the mask correction circuit 22. A masking circuit comprising an AND gate 26 is provided to apply the selected mask to the sum value generated by the adder 18. The output of the AND gate 26 is an integral floating-point value which is placed in an output register 30.

Figure 3:
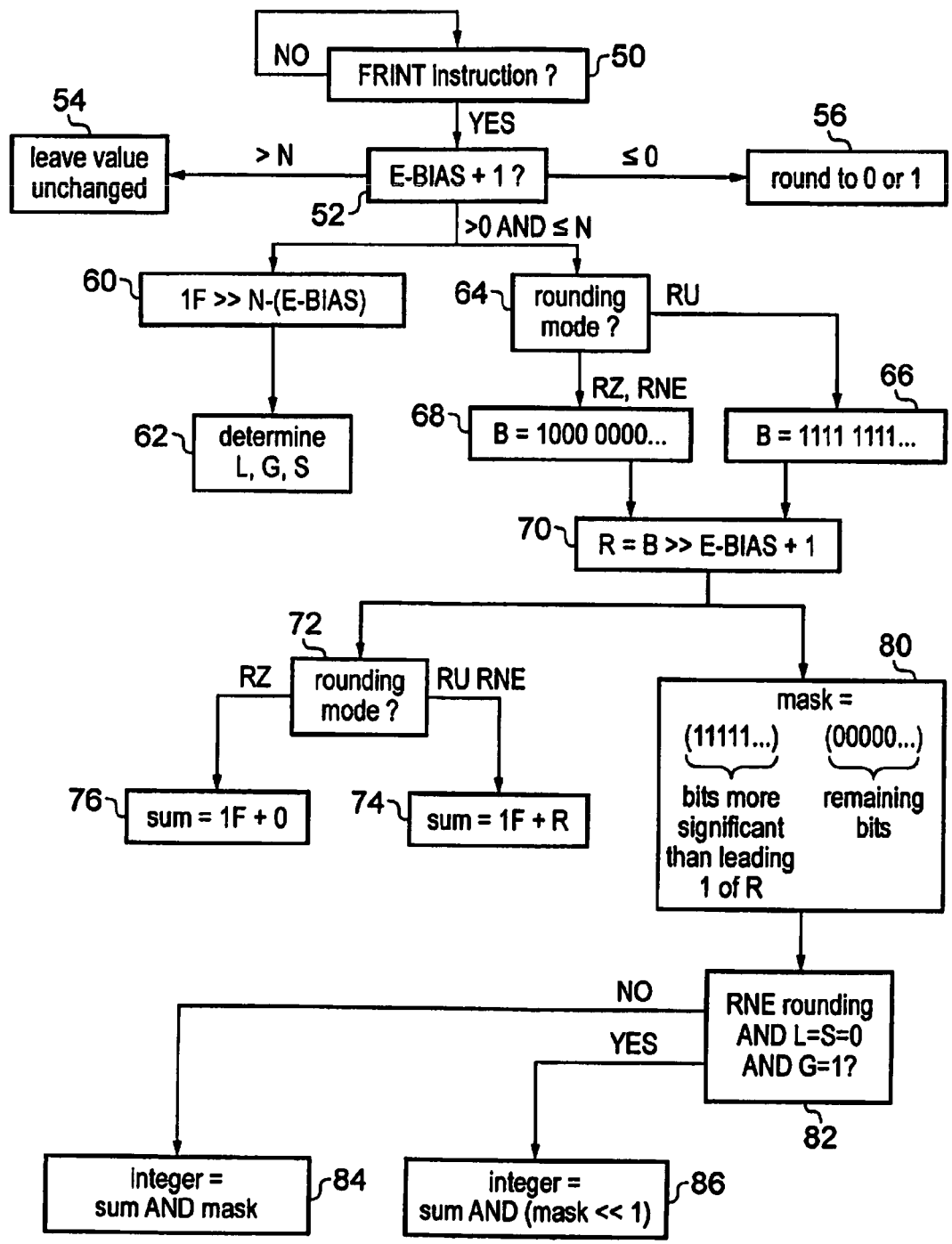
FIG. 3 illustrates a method of executing a FRINT instruction.

FIG. 3 illustrates a method of executing the PRINT instruction using the processing circuitry 2 shown in FIG. 2. At step 50 the control circuitry 4 determines whether or not the currently executed instruction is a FRINT instruction. If so, then at step 52 the control circuitry 4 determines the value of (E−BIAS+1), where E is the exponent of the floating-point value being rounded and BIAS is the exponent bias (e.g. 127 for a single precision floating-point value).

If the value of (E−BIAS+1) is greater than N, where N is the number of non-implicit significand bits F (i.e. excluding the implicit bit 1 of the significand 1.F), then the value to be rounded is already an integer. In this case, at step 54 the control circuitry 4 controls the processing circuitry 2 to output the significand of the floating-point value unchanged.

Alternatively, if at step 52 the value of (E−BIAS+1) is less than or equal to zero, then the magnitude of the value to be rounded lies between 0 and 1 and so the rounded result will be either 0 or 1. In this case, at step 56, the control circuitry 4 may control the processing circuitry 2 to generate the rounded result. In this situation, the rounded result can be calculated based on the significand and the current rounding mode directly, without the need for invoking the full adding and masking functionality of the processing circuitry 2.

On the other hand, if the value of (E−BIAS+1) is greater than zero and less than or equal to N, then at step 60, the right shifter 14 right shifts the significand 1.F (including the implicit bit 1) by (N−(E−BIAS)) bit positions. This converts the significand to an integer value to allow calculation of status flags L, G, S at step 62. The status flags L, G, S provide information about whether the floating-point value is even or odd and whether the floating-point value lies half way between two integer values. This is useful for determining whether a value should be rounded up or down in the RNE rounding mode, for example.

Figure 4:
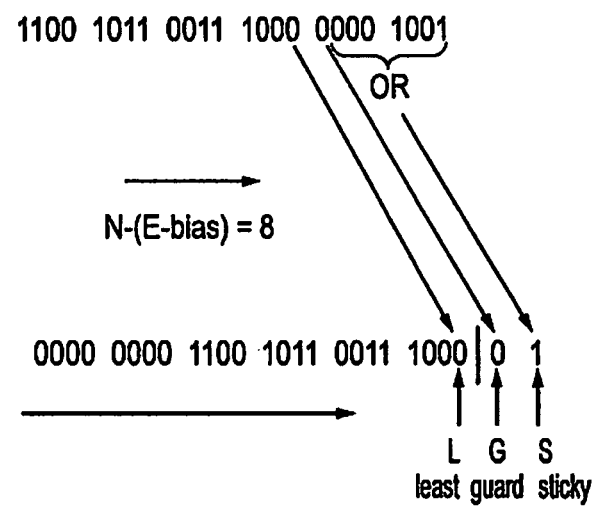
FIG. 4 illustrates an example of calculating status flags when shifting a floating-point value.

FIG. 4 illustrates an example of the way in which the status flags may be generated at steps 60 and 62. When the significand of the floating-point value is converted to an integer (in the example of FIG. 4 by right shifting by 8 bit positions), the "least" status flag L takes the value of the least significant bit of the shifted value, which corresponds to the least significant integral-valued bit in the original significand. The L flag indicates whether the floating-point value is even (if L=0) or odd (if L=1).

The "guard" flag G takes the value of the bit which was shifted out of the shifted result by one bit position, which corresponds to the most significant fractional-valued bit of the original significand. That is, if the significand was to be converted to an integer, then this bit would be lost due to the right shifting, but the guard flag G retains the value of this bit to indicate whether the fractional-valued part of the original significand lies between 0 and 0.4999 . . . (if G=0) or between 0.5 and 0.9999 . . . (if G=1).

The "sticky" flag S takes a value of 1 if any of the fractional-valued bits of the significand, excluding the most significant fractional-valued bit, has a value of 1. Hence, the sticky flag S is equivalent to the OR combination of the fractional-valued bits other than the most significant fractional-valued bit. In practice, the S flag may be calculated by setting the flag to 1 if, on right shifting the significand, any of the bits shifted past the S flag position in the shifted result have a value of 1, and then retaining the value of 1 irrespective of the value of any further shifted out bit. The S flag indicates whether or not the floating-point value lies exactly on an integer or half integer value (if S=0) or whether it lies somewhere between the integer and half integer values (if S=1).

It will be appreciated that the significand is right shifted at step 60 for the purpose of calculating the L, G and S flags. The right shifted significand is not used for the remainder of the FRINT operation.

Meanwhile at step 64, the control circuitry 4 determines which rounding mode is to be used for the round to integral-floating point operation. Each rounding mode may provide different rules for determining, for a floating-point value which lies between two neighbouring integral floating-point values, which of the integral floating-point values the floating-point value is rounded to. For example, the processing circuitry 2 may provide any one or more of the following rounding modes;

A round away from zero (RU) rounding mode. In the RU rounding mode, a floating-point value lying between two integral floating-point values is rounded to the one of the two integral floating-point values having the greatest absolute magnitude. For example, a value of 2.9 would be rounded to the integer 3.0 and a value of −3.2 would be rounded to a value of −4.0 in the RU rounding mode.

A round to nearest, ties to even, (RNE) rounding mode for rounding the floating-point value to the nearest of the two neighbouring integral floating-point values, with floating-point values lying half way between the two integral floating-point values being rounded to the one of the integral floating-point values that is an even value. For example, a value of 2.9 would be rounded to the integer 3.0, while a value of 2.5 would be rounded to the nearest even integral value 2.0.

A round towards zero (RZ) rounding mode for rounding the floating-point value to the one of the two integral floating-point values having the smallest absolute magnitude. For example, values of 2.3 and −2.8 would be rounded to the integral values 2.0 and −2.0 respectively.

A round towards positive infinity (RP) rounding mode for rounding the floating-point value to the one of the two integral floating-point values which lies the closest to positive infinity. For example, a value of 2.2 would be rounded to an integral value of 3.0 and a value of −2.4 would be rounded to an integral value of −2.0.

A round towards negative infinity (RM) rounding mode for rounding the floating-point value to the one of the two neighbouring integral floating-point values lying closest to negative infinity. For example, a value of 3.2 would be rounded to an integral value of 3.0 and a value of −6.9 would be rounded to −7.0.

The remainder of this specification will describe only the RU, RZ and RNE rounding modes. This is because the RP and RM rounding modes can be implemented using the processing for the other rounding modes. The RP rounding mode can be implemented by using the RU rounding mode if the floating-point value to be rounded is positive and the RZ rounding mode if the floating-point value is negative. Conversely, the RM rounding mode can be implemented by performing the RZ rounding mode if the floating-point to be rounded is positive and the RU rounding mode if the floating-point to be rounded is negative. The sign bit of the floating-point value can be used to select whether to use RU or RZ rounding for the RP and RM cases. Hence, later references to RU and RZ rounding implicitly also describe features of the RP and RM rounding.

Hence, at step 64 the rounding mode is determined. For example, the control circuitry 4 may do this based on the opcode of the PRINT instruction or based on a field within the instruction which specifies which rounding mode should be used. Alternatively, if the processing circuitry only supports one rounding mode then this rounding mode is used. RP or RM rounding modes can be used by selecting an appropriate one of RU and RZ rounding modes based on the sign bit of the value to be rounded. If the rounding mode to be used is RU, then at step 66 the control circuitry 4 controls the processing circuitry 2 to store a base value of 0b11111111 . . . in the base value register 10. On the other hand, if the rounding mode is the RZ or RNE rounding mode then at step 68 the control circuitry 4 controls the processing circuitry 2 to load a base value of 0b10000000 . . . in to the base value register 10.

At step 70, the right shifter 12 right shifts the base value stored in the base value register 10 by a shift amount of (E−BIAS+1) bit positions to generate a rounding value R. At step 72, the control circuitry 4 determines which rounding mode is being used. If the rounding mode is RP or RNE, then at step 74 the control circuitry 4 controls the multiplexer 16 to provide the rounding value R generated by the right shifter 12 to the adding circuit 18, which adds the rounding value R to the significand 1F. On the other hand, if the rounding mode is the RZ rounding mode then at step 76 the control circuitry 4 controls the multiplexer 16 to zero the rounding value by supplying a zero value to the adder 18, which adds the zero value to the significand 1F. The result of the addition performed by the adding circuitry 18 is output as a sum value.

Meanwhile, at step 80 the control circuitry 4 controls the mask generating circuitry 20 to generate a mask using the rounding value R generated by the right shifter 12 at step 70. Even in the case of the RZ rounding mode, the mask generator 20 still uses the rounding value R in its unzeroed state. The mask generator 20 generates the mask with bit values of 1 at any bit positions that are more significant than the position of the leading non-zero bit of the rounding value R, and bit values of 0 at any remaining bit positions. Since the leading non-zero bit of the rounding value R is at the bit position corresponding to the most significant fractional-valued bit of the significand 1.F, the mask will have bit values of 1 corresponding to integral-valued bit positions of the significand 1.F and bit values of 0 corresponding to fractional-valued bit positions of the significand 1.F.

At step 82, the control circuitry 4 checks whether the rounding mode is the RNE rounding mode and checks the values of the status flags L, G, S generated by the right shifter 14 at step 62. If the rounding mode is not the RNE rounding mode, the L flag does not equal zero, the G flag does not equal one, or the S flag does not equal zero, then the mask does not need to be corrected and so at step 84, the control circuitry 4 controls the multiplexer 24 to pass the uncorrected mask to the AND gate 26. The AND gate 26 applies the mask to the sum produced by the adding circuit 18. This clears the fractional-valued bits of the sum so as to generate the integer significand. The integer significand is placed in the output register 30 where it can be accessed by the processing circuitry 2 when performing other floating-point operations.

On the other hand, if at step 82 it is determined that the RNE rounding mode is being used, then the mask may need to be corrected to ensure that the value is rounded to an even value in the case of a floating-point value lying halfway between two integers. If the status flags have values of L=0, G=1, S=0 then the original floating-point lies exactly halfway between two integers and rounding the value up will result in an odd value. Therefore, in this case the mask is corrected by the mask correction circuit 22 at step 86, by left shifting the mask generated by the mask generator 20 by one bit position. This generates a mask in which, in addition to the fractional-valued bit positions, the least significant integral-valued bit position of the significand also corresponds to a mask bit having a value of 0. The multiplexer 24 supplies the corrected mask to the AND gate 26, which applies the corrected mask to the sum produced by the adding circuit 18. This clears all the fractional-valued bits of sum value and also clears the least significant integral-valued bit to ensure that the rounded integral floating-point value is an even value as required the RNE rounding mode. The result is then placed in output register 30.

Hence, as shown in FIGS. 2 and 3, different rounding modes of the round to integral floating-point operation can be implemented in hardware and can therefore be performed more quickly than software implementations which use multiple instructions to perform different stages of the operation. Moreover, since the addition and masking parts of the round to integral floating-point operation are performed on the original significand, not a shifted significand, the result produced by the AND gate 26 is already normalised and so there is no need to perform a further left shift to normalise the floating-point value. Therefore, there is no need to add a left shifter to the end of the processing pipeline, thus allowing quicker processing of floating-point operations using the processing circuitry 2.

Figure 5:
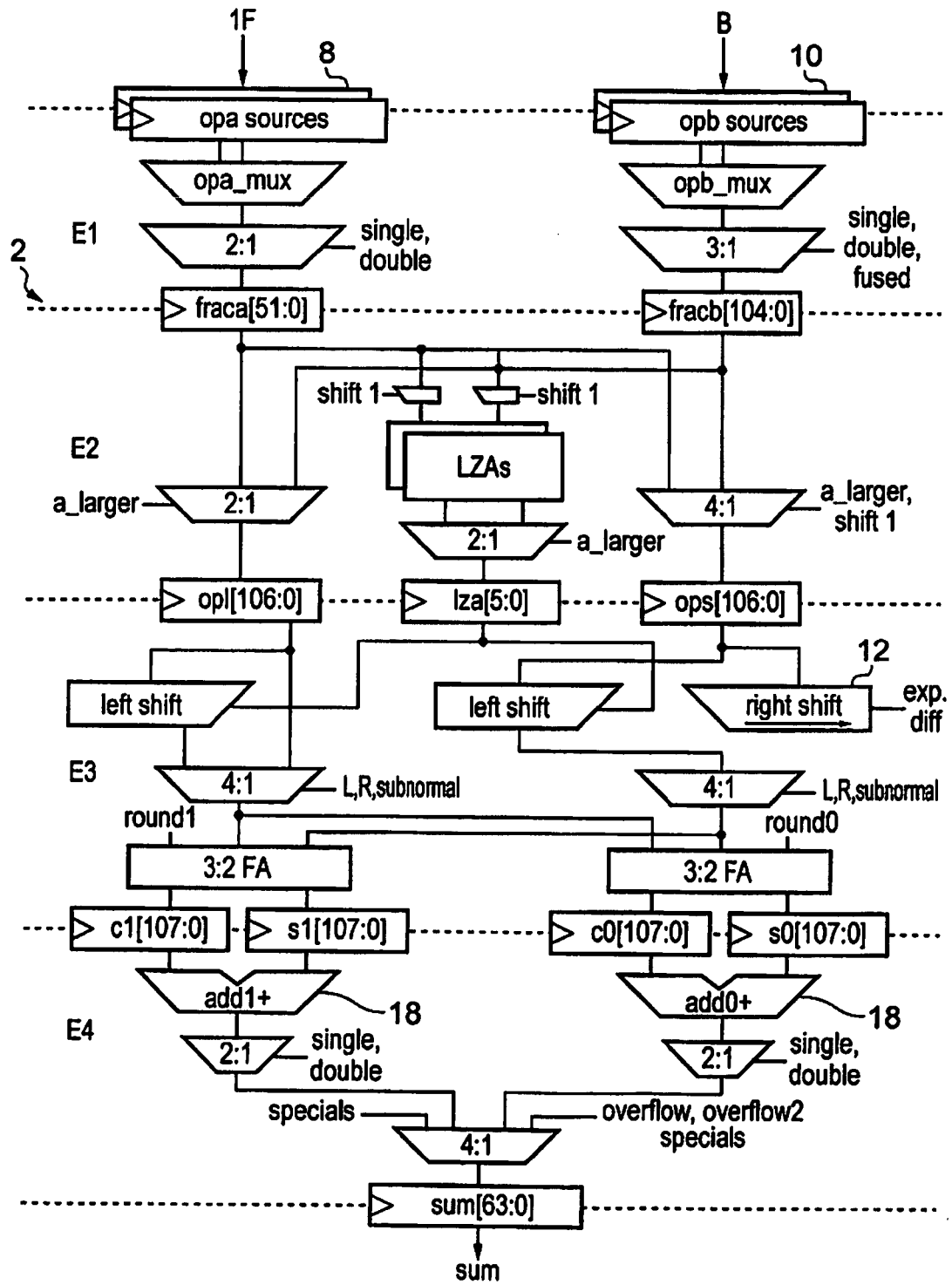
FIG. 5 illustrates a portion of a processing pipeline for executing floating-point operations.

The circuitry for performing the FRINT operation may be at least partially shared with circuitry for performing other floating-point operations. FIG. 5 shows an example of processing circuitry for performing a floating-point add operation. When performing the add operation, two floating-point values to be added are placed in registers opa and opb in stage E1 of the processing circuitry 2. At stage E3, one of the operands can be shifted by a shift amount dependent on the difference between the exponents of the two values, to align bit values having the same significance in each operand. At stage E4, the aligned values are then added to generate a sum value.

Some of the processing circuitry 2 shown in FIG. 5 can be reused for performing the FRINT operation. The significand to be rounded may be placed in the register opa corresponding to register 8 of FIG. 2 and the base value B may be placed in the register opb corresponding to register 10 of FIG. 2. The right shifter 12 shown in FIG. 2 can then be implemented using the right shifter in stage E3 of the processing circuitry 2 of FIG. 5. Also, the adder 18 of FIG. 2 can be implemented using the adders shown in stage E4 of FIG. 5. In this example, the mask generating and correcting circuitry 20, 22, the AND gate 26 and the right shifter 14 of FIG. 2 are not shared with the adding circuitry, so would be provided in addition to the adding circuitry shown in FIG. 5. By sharing circuitry for different processing operations when possible, power consumption and circuit area can be reduced.

Hence, when performing the PRINT operation, the significand and base value can be input to the circuitry at stages E1 and E2. At stage E3, the rounding value can be constructed from the base value using the right shifter 12. At stage E4 the significand and rounding value can be added to generate the sum value. The mask would be generated and applied to the sum using circuitry 20, 22, 24, 26 as shown in FIG. 2.

It will be seen from FIG. 5 that stage E4 of the processing circuitry actually produces two sums of the significand and the rounding value. This may be the case for both the floating-point add operation and the FRINT operation. Two sums are calculated in case the rounding causes an increase in the exponent when the sum value is normalised. By calculating two sums for the two possible results for the exponent, and then selecting the sum which is the correct result, it is not necessary to normalise the result value after stage E4, and so the number of processing cycles required to perform the operation can be reduced.

Figure 6:
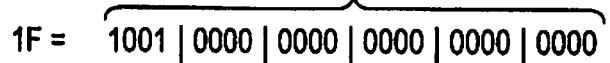
FIG. 6 illustrates an example of RU rounding using the present technique.
Figure 6:
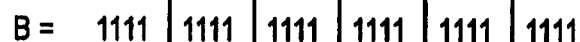
Figure 6:
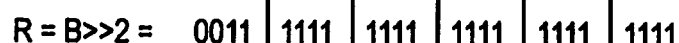
Figure 6:
Figure 6:
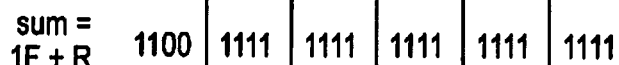
Figure 6:
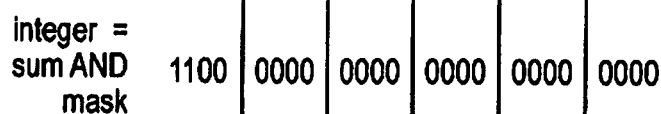

FIG. 6 shows an example of performing RU rounding using the present technique. For example, a round to integral-floating point (FRINT) instruction is executed to perform RU rounding of a floating-point value of 2.25 to give an integral floating-point result of 3.0. The stored format of the floating-point value equivalent to 2.25 is shown in FIG. 6. Including the implicit bit, the significand 1.F is 0b10010000 . . . . Since the RU rounding mode is being used, the base value B is set to 0b11111111 . . . As the L, G and S flags are not relevant for the RU rounding mode, calculation of these flags is not illustrated in FIG. 6, although it will be appreciated that these flags may still be calculated even if not actually required for the round to integral floating-point operation.

The exponent E is 128, the exponent bias is 127, and so E−BIAS+1=2. Therefore, the base value B is right shifted by 2 bit positions, to generate a rounding value R of 0b00111111 . . . as shown in FIG. 6. The rounding value is then converted in a mask by mask generating circuit 20 to yield a mask of 0b11000000 . . . , with bit values to the left of the leading non-zero bit in the rounding value R having values of 1 and the other bits having values of 0. The adding circuit 18 then adds the significand 1.F to the rounding value R to generate a sum value of 0b11001111 . . . . The mask is then applied to the sum value to clear all the fractional-valued bits, yielding a result of 0b11000000 . . . . The implicit 1 in the rounded significand is then removed and the remainder of the significand (0b10000 . . . ) is stored in the output register 30. As shown at the bottom of FIG. 6, this value corresponds to an integral floating-point value of 3.0, which is the correct rounded result for the RU rounding.

Figure 7:
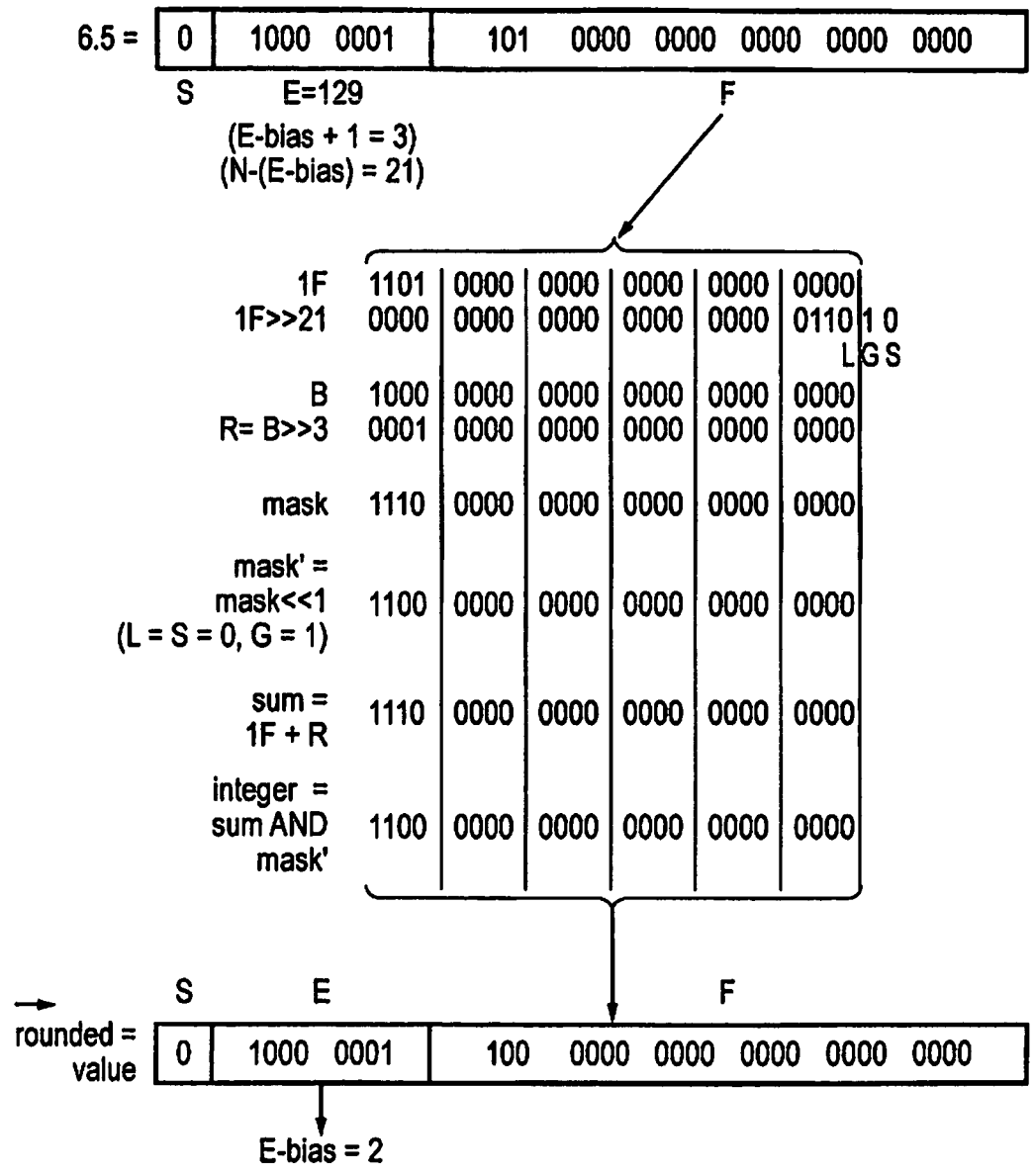
FIG. 7 illustrates an example of RNE rounding.

FIG. 7 shows an example of performing RNE FRINT using the present technique. In this example, FRINT is applied to a value of 6.5. Since RNE rounding is being used and the value is halfway between two integers, the value is rounded to the nearest even value which is an integral value of 6.0. The stored representation of the floating-point value 6.5 is shown at the top of FIG. 7. The implicit 1 bit is combined with the stored significand to generate the significand 1.F of 0b11010000 . . . shown in FIG. 7. The exponent E is 129, the exponent bias BIAS is 127, and the number of explicitly indicated bits of the significand (excluding the implicit 1 bit) N is 23. Hence, E−BIAS+1=3 and N−(E−BIAS))=21.

In RNE rounding, the status flags L, G, S are required for determining whether or not the mask needs to be corrected to account for an even value. Hence, the calculation of L, G and S flags is illustrated in FIG. 7. As N−(E−BIAS))=21, the right shifter 14 right shifts the significand 1.F by 21 bit positions to convert the significand to an integer value. The L, G, S flags are then calculated as shown in FIG. 4 to yield L=0, G=1, S=0, as shown in FIG. 7. This indicates that the integral-valued bits of the original significand have an even value, and that the fractional-valued bits have a value of exactly half.

Since RNE rounding is being performed, the base value B is 0b10000000 . . . . Since E−BIAS+1=3, the right shifter 12 right shifts the base value B by 3 bit positions to yield the rounding value R of 0b00010000 . . . . The mask generator 20 converts the rounding value R into the mask 0b1110000 00 . . . . Since RNE rounding is being used, and L=0, G=1 and S=0, the mask needs to be corrected to ensure an even rounding result. The mask correction circuit 22 therefore left shifts the mask by one bit position to yield a corrected mask 0b11000000 . . . .

Meanwhile, the adding circuit 18 adds the unshifted significand 1.F to the rounding value R to generate a sum of 0b11100000 . . . . The corrected mask is then applied to the sum to generate a rounded significand of 0b11000000 . . . , in which both the fractional-valued bits and the least significant integral-valued bit have been cleared. The leading 1 is then removed and the remaining bits stored as F in the output register 30. As shown at the bottom of FIG. 7, the stored rounded value corresponds to the correct rounded value of 6.0.

Figure 8:
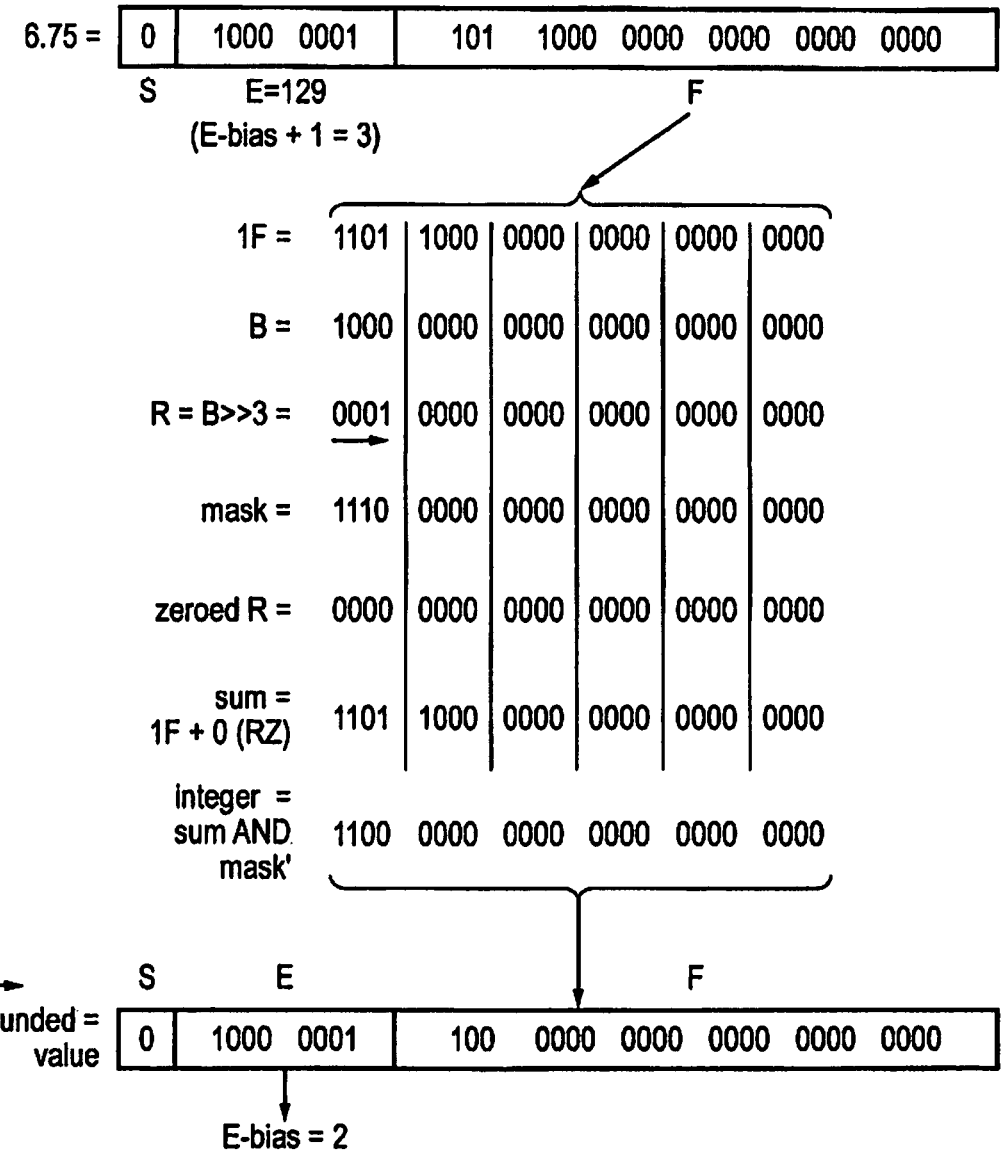
FIG. 8 illustrates an example of RZ rounding.

FIG. 8 shows an example of using RZ rounding to round the value of 6.75 to the integral value 6.0, which is the neighbouring integer lying closest to zero. The value of 6.75 is represented in floating-point form using the encoding shown at the top of FIG. 8. Including the implicit leading 1 bit, the significand 1.F is 0b11011000 . . . . The exponent E=129, the exponent bias BIAS=127, and so E−BIAS+1=3. Again, calculation of the L, G and S flags has not been illustrated as this is not required for RZ rounding, but it will be appreciated that the processing circuitry 2 may still calculate these flags.

Since RZ rounding is used, a base value B of 0b100000 00 . . . is loaded into the base value register 10. It will be appreciated that any other base value having a leading non-zero bit (e.g. 0b11111111 . . . or 0b10101010 . . . ) could also be used for RZ rounding if desired, since for RZ rounding the rounding value will be zeroed before adding it to the significand, and so all that matters is that the leading bit of the base value has a value of 1, in order to generate the correct mask. The base value B is right shifted by 3 bit positions to generate the rounding value 0b00010000 . . . . The mask generating circuit 20 uses the rounding value R to generate a mask 0b111000 00 . . . for clearing fractional-valued bits of the sum value.

As RZ rounding is being used, the rounding value R is zeroed by multiplexer 16 before adding the zeroed rounding value to the significand 1.F. Hence, the significand 1.F remains unchanged in the sum value. The mask generated by mask generator 20 is then applied to the sum to generate the rounded integral floating-point value. The leading bit of the significand is removed and the remaining portion of the significand stored in the register 30. As shown at the bottom of FIG. 8, the representation of the rounded value corresponds to the correct integral value of 6.0.

Figure 9:
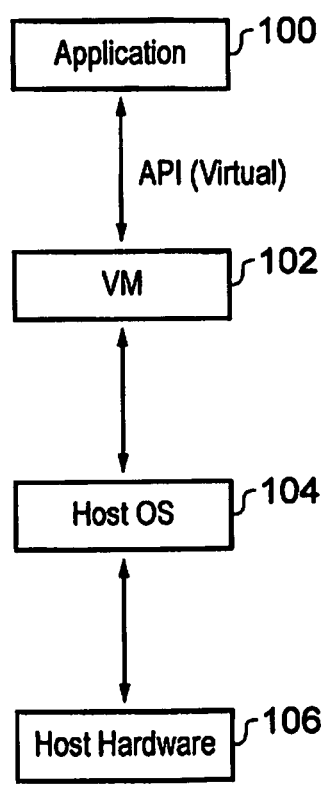
FIG. 9 illustrates an example of a virtual machine implementation.

FIG. 9 illustrates a virtual machine implementation that may be used in some embodiments. Whilst the earlier described embodiments implement the present technique in terms of apparatus and methods for operating specific processing hardware supporting the techniques concerned, it is also possible to provide so-called virtual machine implementations of hardware devices. These virtual machine implementations run on a host processor 106 typically running a host operating system 104 supporting a virtual machine program 102. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 102 is capable of executing an application program (or operating system) 100 to give the same results as would be given by execution of the program by a real hardware device. Thus, the program instructions may be executed from within the application program 100 using the virtual machine program 102.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
processing circuitry configured to perform a round to integral floating-point operation for rounding a floating-point value to an integral floating-point value, said floating-point value having a significand and an exponent; and
control circuitry configured to control said processing circuitry to perform said round to integral floating-point operation in response to execution of a floating-point round to integral floating-point instruction;
said processing circuitry comprising:
shifting circuitry configured to generate a rounding value by shifting a base value by a shift amount dependent on said exponent of said floating-point value;
adding circuitry configured to add said rounding value to said significand of said floating-point value to generate a sum value;
mask generating circuitry configured to generate a mask for clearing bits of said sum value having bit positions corresponding to fractional-valued bit positions of said significand; and
masking circuitry configured to apply said mask to said sum value to generate said integral floating-point value,
wherein said processing circuitry has at least one rounding mode for selecting, when said floating-point value lying between two integral floating-point values, which of said two integral floating-point values to round said floating-point value to during said round to integral floating-point operation, and
wherein said processing circuitry has a round to nearest, ties to even, (RNE) rounding mode for rounding said floating-point value to the nearest of said two integral floating-point values, with floating-point values lying halfway between said two integral floating-point values being rounded to the one of said two integral floating-point value that is an even value, and
wherein said RNE rounding mode, if said floating-point value lies halfway between said two integral floating-point values, and a least significant integral-valued bit of said significand has a zero bit value, then said mask generating circuitry is configured to correct said mask, and said masking circuitry is configured to apply said corrected mask to said sum value to clear a bit of said sum value having a bit position corresponding to said least significant integral-valued bit of said significand.

2. The data processing apparatus according to claim 1, wherein said shifting circuitry is configured to right shift said base value to generate said rounding value.

3. The data processing apparatus according to claim 1, wherein said rounding value has a leading non-zero bit at a bit position corresponding to a bit position of the most significant fractional-valued bit of said significand of said floating-point value.

4. The data processing apparatus according to claim 1, wherein:
said base value has a most significant bit having a non-zero value; and
said shifting circuitry is configured to right shift said base value by a shift amount of (E−BIAS+1) bit positions, where E is said exponent of said floating-point value and BIAS is an exponent bias of said floating-point value.

5. The data processing apparatus according to claim 1, wherein said masking circuitry comprises an AND gate configured to apply a bitwise AND operation to said sum value and said mask.

6. The data processing apparatus according to claim 5, wherein bits of said mask at bit positions corresponding to fractional-valued bit positions of said significand have bit values of zero.

7. The data processing apparatus according to claim 6, wherein bits of said mask at bit positions corresponding to integral-valued bit positions of said significand have bit values of one.

8. The data processing apparatus according to claim 1, wherein said mask generating circuitry is configured to generate said mask based on said rounding value.

9. The data processing apparatus according to claim 1, wherein said control circuitry is configured, in response to execution of a floating-point add instruction, to control said processing circuitry to perform an add operation using said shifting circuitry and said adding circuitry.

10. The data processing apparatus according to claim 1, wherein said processing circuitry has a plurality of rounding modes, said floating-point round to integral floating-point instruction specifying which of said plurality of rounding modes should be used for said round to integral floating-point operation.

11. The data processing apparatus according to claim 1, wherein said processing circuitry has a round away from zero (RU) rounding mode for rounding said floating-point value to the one of said two integral floating-point values having the greatest absolute magnitude.

12. The data processing apparatus according to claim 11, wherein in said RU rounding mode all bits of said base value have non-zero bit values.

13. The data processing apparatus according to claim 1, wherein in said RNE rounding mode a most significant bit of said base value has a non-zero bit value and remaining bits of said base value have zero bit values.

14. The data processing apparatus according to claim 1, wherein said mask generating circuitry is configured to correct said mask by left shifting said mask by one bit position.

15. The data processing apparatus according to claim 1, wherein said processing circuitry has a round towards zero (RZ) rounding mode for rounding said floating-point value to the one of said two integral floating-point values having the smallest absolute magnitude.

16. A data processing apparatus comprising:
processing circuitry configured to perform a round to integral floating-point operation for rounding a floating-point value to an integral floating-point value, said floating-point value have a significand and an exponent; and
control circuitry configured to control said processing circuitry to perform said round to integral floating-point operation in response to execution of a floating-point round to integral floating-point instruction;
said processing circuitry comprising;
shifting circuitry configured to generate a rounding value by shifting a base value by a shift amount dependent on said exponent of said floating-point value;
adding circuitry configured to add said rounding value to said significand of said floating-point value to generate a sum value;
mask generating circuitry configured to generate a mask for clearing bits of said sum value having bit positions corresponding to fraction-valued bit positions of said significand; and
masking circuitry configured to apply said mask to said sum value to generate said integral floating-point value,
wherein said processing circuitry has at least one rounding mode for selecting, when said floating-point value is a value lying between two integral floating-point values, which of said two integral floating-point values to round said floating-point value to during said round to integral floating-point operation, and
wherein said processing circuitry has a round toward zero (RZ) rounding mode for rounding said floating-point value to the one of said two integral floating-point values having the smallest absolute magnitude, and
wherein in said RZ rounding mode, all bits of said rounding value are set to zero before adding the zeroed rounding value to said significand to generate said sum value, and said mask is generated using the unzeroed rounding value.

17. A data processing apparatus comprising:
processing means for performing a round to integral floating-point operation for rounding a floating-point value to an integral floating-point value, said floating-point value having a significand and an exponent; and
control means for controlling said processing means to perform said round to integral floating-point operation in response to execution of a floating-point round to integral floating-point instruction;
said processing means comprising:
shifting means for generating a rounding value by shifting a base value by a shift amount dependent on said exponent of said floating-point value;
adding means for adding said rounding value to said significand of said floating-point value to generate a sum value;
mask generating means for generating a mask for clearing bits of said sum value having bit positions corresponding to fractional-valued bit positions of said significand; and
masking means for applying said mask to said sum value to generate said integral floating-point value,
wherein said processing means has at least one rounding mode for selecting, when said floating-point value is a value lying between two integral floating-point values, which of said two integral floating-point values to round said floating-point value to during said round to integral floating-point operation, and
wherein said processing means has a round to nearest, ties to even, (RNE) round mode for rounding said floating-point value to the nearest of said two integral floating-point values, with floating-point values lying halfway between said two integral floating-point values being round to the one of said two integral floating-point values that is an even value, and
wherein in said RNE rounding mode, if said floating-point value lies halfway between said two integral floating-point values, and a least significant integral-valued bit of said significand has a zero bit value, then said mask generating means is configured to correct said mask, and said masking means is configurd to apply said corrected mask to said sum value to clear a bit of said sum value having a big position corresponding to said least significant integral-valued bit of said significand.

* * * * *